United States Patent [19]

Herman

[11] Patent Number: 5,008,678
[45] Date of Patent: Apr. 16, 1991

[54] ELECTRONICALLY SCANNING VEHICLE RADAR SENSOR

[75] Inventor: Martin I. Herman, Torrance, Calif.

[73] Assignee: Hughes Aircraft Company, Los Angeles, Calif.

[21] Appl. No.: 487,338

[22] Filed: Mar. 2, 1990

[51] Int. Cl.$^5$ .............................................. G01S 13/60
[52] U.S. Cl. ......................................... 342/158; 342/70
[58] Field of Search ..................... 342/158, 70, 71, 72, 342/61

[56] References Cited

U.S. PATENT DOCUMENTS

| H605 | 3/1989 | Finker | 343/853 |
|---|---|---|---|
| 3,887,925 | 6/1975 | Ranghelli et al. | 343/795 |
| 3,997,900 | 12/1976 | Chin et al. | 343/705 |
| 4,203,113 | 5/1980 | Baghdady | 342/71 |
| 4,490,721 | 12/1984 | Stockton et al. | 342/368 |
| 4,724,441 | 2/1988 | Fithian et al. | 342/368 |
| 4,737,793 | 4/1988 | Munson et al. | 342/361 |
| 4,739,334 | 4/1988 | Soref | 342/368 |
| 4,806,937 | 2/1989 | Peil | 342/175 |
| 4,812,788 | 3/1989 | Wong et al. | 333/113 |
| 4,845,506 | 7/1989 | Shibata et al. | 343/713 |
| 4,881,078 | 11/1989 | Yamane et al. | 342/155 |

OTHER PUBLICATIONS

R. Johnson et al., "Antenna Engineering Handbook", Chapters 21, 20, and 7, McGraw-Hill, New York, (1984).

Primary Examiner—John B. Sotomayor
Attorney, Agent, or Firm—Terje Gudmestad; W. K. Denson-Low

[57] ABSTRACT

A plurality of transmitting (14, 16, 18, 20) and receiving antenna elements (22, 24, 26, 28) are formed on a support member (12) which may be mounted on a corner of a vehicle for scanning a pattern including areas on opposite sides of the vehicle corner. In an automotive application, the pattern may include a rear area, and a blind spot on the side of the vehicle adjacent to the rear area. A transmitter (50) is connected to the transmitting antenna elements (14, 16, 18, 20) by a passive phased array (30) such as a planar microstrip Butler matrix, and an electronic switch (52) which sequentially connects the transmitter (50) to inputs of the transmitting array (30). A receiver (62) is similarly connected to the receiving antenna elements (22, 24, 26, 28) by a planar microstrip passive phased array (40), and an electronic switch (64) which sequentially connects the receiver (62) to outputs of the receiving array (40). The support member (12) may be formed into a non-planar shape, or be flexible enough to be bent into a non-planar shape, to conform to a non-planar surface of the vehicle on which the sensor is to be mounted.

10 Claims, 2 Drawing Sheets 5,008,678

ELECTRONICALLY SCANNING VEHICLE RADAR SENSOR

BACKGROUND OF THE INVENTION

1. Field of the Invention

The present invention generally relates to a sensor for sensing objects in proximity to a vehicle, and more particularly to an electronically scanning radar sensor which is especially advantageous for scanning around a corner of a vehicle.

2. Description of the Related Art

Phased array radar systems are effective for scanning areas to sense the presence of objects therein. However, such systems have been heretofore very expensive, and limited to military applications in which cost is not a particular problem. Applications of conformal radar antenna arrays for mounting on aircraft, missiles, satellites, etc., are described in chapter 21 of a textbook entitled "Antenna Engineering Handbook", edited by R. Johnson et al, McGraw Hill, New York (1984). This textbook also includes a general description of microstrip antennas in chapter 7, and phased arrays including Butler and Blass matrices in chapter 20, as component elements of phased array radar systems.

A major obstacle to adapting phased array radar sensors to civilian applications such as near-object detectors (NOD) for automotive vehicles has been the complexity of the phased arrays which interconnect the transceiver to the antenna elements. Waveguides have been conventionally used for this application, as described in U.S. Pat. No. 4,812,788, entitled "WAVEGUIDE MATRIX INCLUDING IN-PLANE CROSSOVER", issued Mar. 14, 1989, to M. Wong et al. This patent discloses an improved configuration which enables the waveguides to be formed in a single plane without crossovers. However, the manufacturing process requires precisely forming the waveguides, walls separating the waveguides, coupling apertures, and phase shifters in a parallel array within a common metallic plate using automated milling machines. This process is very time consuming and expensive, and generally precludes application to commercial use.

SUMMARY OF THE INVENTION

In accordance with the present invention, a plurality of transmitting and receiving antenna elements are formed on a support member which may be mounted on a corner of a vehicle for scanning a pattern including areas on opposite sides of the vehicle corner. In an automotive application, the pattern may include a rear area, and a blind spot on the side of the vehicle adjacent to the rear area. A transmitter is connected to the transmitting antenna elements by a passive phased array such as a planar microstrip Butler matrix, and an electronic switch which sequentially connects the transmitter to inputs of the transmitting array. A receiver is similarly connected to the receiving antenna elements by a planar microstrip passive phased array, and an electronic switch which sequentially connects the receiver to outputs of the receiving array. The support member may be formed into a non-planar shape, or be flexible enough to be bent into a non-planar shape, to conform to a non-planar surface of the vehicle on which the sensor is to be mounted.

Electronic scanning of an antenna beam by Butler or Blass matrix techniques allows for extreme flexibility and enhanced performed for vehicular radars. The antenna elements can be a waveguide array, or a more compact microstrip antenna array. The latter may be formed on a flexible substrate, enabling the array to be made conformal to the vehicle. This is important for aerodynamics and styling.

The present sensor can be made affordable using microstrip and monolithic microwave integrated circuit (MMIC) technology to fabricate the antenna and array elements on a single printed circuit board to provide an electronic scanning radar sensor which has heretofore been prohibitively expensive for automotive use. The flexibility of the present sensor enables elimination via radar of notorious "blind spots" on the sides of automotive vehicles which have contributed to many traffic accidents, as well as providing a rear obstacle/blind spot sensor, and a more versatile rear radar unit.

A further important advantage of the present invention is a reduction of the number antennas (each comprising a transmitting and receiving element) over the prior art. The present configuration utilizing electronic scanning by means of a Butler or other array enables an area to be scanned using one-half the number antennas required in the prior art.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
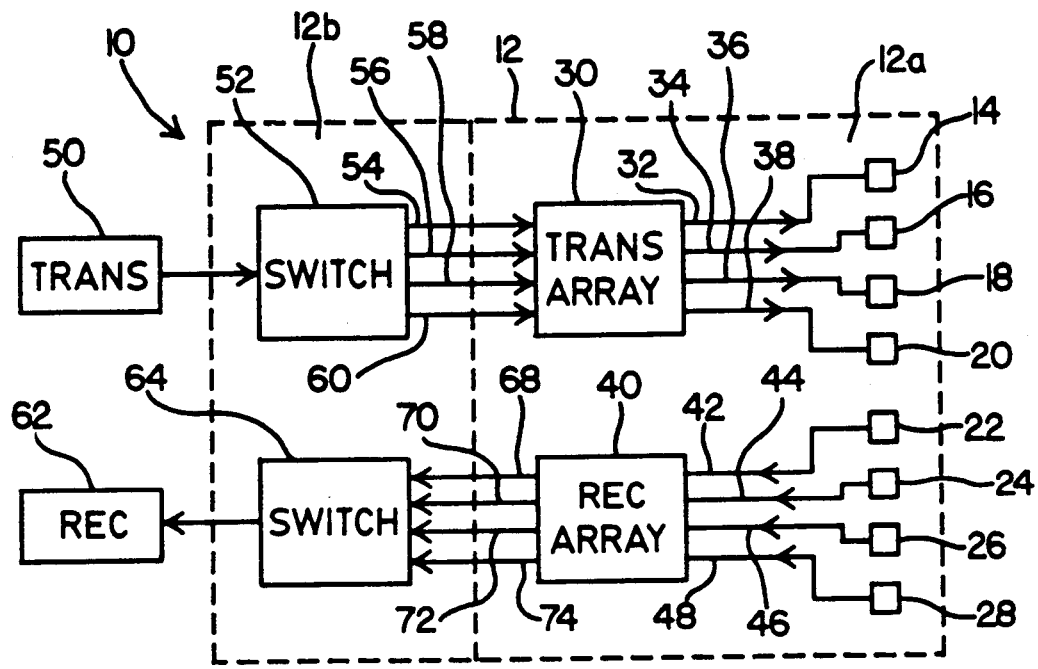
FIG. 1 is a schematic block diagram illustrating an electronically scanning vehicle radar sensor embodying the present invention.

Referring now to FIG. 1 of the drawing, an electronically scanning vehicle radar sensor embodying the present invention is generally designated as 10, and includes a support member or substrate 12. A plurality of transmitting antenna elements 14, 16, 18, and 20, and a plurality of receiving antenna elements 22, 24, 26, and 28 are formed on a surface 12a of the substrate 12 which is designed to face away from a surface of a vehicle on which the sensor 10 is to be mounted. The transmitting and antenna elements may be constituted by a waveguide array, or more preferably by a microstrip antenna array, and are spaced in relation to each other such as to cover a predetermined pattern relative to the vehicle when electronically scanned as will be described below. The antenna elements 14 to 28 may be rectangular, monopoles or dipoles, or have a circular or any other desired shape as required for a particular application of the sensor 10. The detailed design of the antenna elements is not the subject matter of the invention, and may have any configuration including those described in chapter 7 of the above referenced "Antenna Engineering Handbook".

In accordance with the present invention, a microstrip passive phased transmitting array 30 is formed on the substrate 12, having outputs 32, 34, 36, and 38 connected to the transmitting antenna elements 14, 16, 18, and 20 respectively. A microstrip passive phased receiving array 40 is also formed on the substrate 12, having inputs 42, 44, 46, and 48 connected to the receiving antenna array elements 22, 24, 26, and 28 respectively. A radar transmitter 50, which is preferably designed to generate signals in the X-band (10 GHz), Ka-band (24 GHz and 32 GHz), or V-band (60 GHz), has an output connected to an input of an electronic transmitting switch unit 52, which in turn has outputs connected to inputs 54, 56, 58, and 60 of the transmitting array 30. A radar receiver 62 has an input connected to an output of an electronic receiving switch unit 64, which in turn has inputs connected to outputs 68, 70, 72, and 74 of the receiving array 40. The substrate 12 is preferably designed such that when the sensor 10 is mounted on a vehicle, the surface 12a with the antenna elements formed thereon faces away from the vehicle, although the invention is not so limited. The substrate 12 may be planar, plastically formed into a non-planar shape to conform to a non-planar surface of a vehicle on which the sensor 10 is to be mounted, or made of a flexible material which is capable of sufficient flexure to be bent into a shape to conform to the non-planar mounting surface of the vehicle.

In operation, a radar signal of any desired type (FMCW, pulsed Doppler, etc.) is generated by the transmitter 50 and applied to the input of the switch unit 52, which includes an electronic scanning arrangement such that the output of the transmitter 50 is sequentially switched to the outputs 54 to 60. In other words, the output signal from the transmitter 50 first appears at the output 54, then at the output 56, the output 58, the output 60, and then again at the output 54, in a continuing sequence. The transmitting array 30 is preferably embodied by a planar microstrip Butler matrix, although the scope of the invention includes the substitution of a Blass or other matrix which performs an equivalent function, such as described in chapter 20 of the above referenced "Antenna Engineering Handbook".

A Butler matrix or array is an antenna beam-forming network using a combination of hybrids and fixed phase shifters, and has the property that a signal incident at each input port produces equal amplitude signals at the output ports. The phase relationships are such that if the outputs are regarded as a linear array of radiating elements, then a beam is formed at an angle deviating from the normal by an integral multiple of $\pi/N$, where N is the number of input ports (which also equals the number of output ports). The N input ports enable a set of beams covering a complete 180° field of view to be generated by the radiating elements.

In this manner, the radar signal which is sequentially switched to the transmitting array 30 by the switch unit 52 is applied to the transmitting antenna elements 14 to 20 with phase shifts produced in the array 30 such that the radar signal is sequentially radiated by the elements 14 to 20 into the predetermined pattern in different directions respectively to scan the area corresponding to the pattern.

The transmitting antenna elements 14, 16, 18, and 20 are spaced relative to each other and relative to the receiving antenna elements 22, 24, 26, and 28 to cover respective areas of the pattern. The switch units 52 and 64 are operated in synchronism with each other, such that corresponding transmitting and receiving antenna elements are scanned together. The receiving array 40 preferably includes a planar microstrip Butler matrix which is essentially similar to that of the transmitting array 30. Since a Butler matrix functions equivalently in both directions, received or echo signals from a sensed object appear at the outputs 68, 70, 72, and 74 of the receiving array 40 in synchronism with the corresponding transmitted signals applied to the inputs 54, 56, 58, and 60 of the transmitting array 30. The output signals from the receiving array 40 are sequentially switched to the receiver 62 by the switch unit 64 for processing to sense the presence of an object in the radar pattern. The details of the received signal processing are not the particular subject matter of the present invention.

In order to facilitate the manufacture of the present sensor 10 at low cost on a commercial production basis, the transmitting antenna elements 14 to 20, receiving antenna elements 22 to 28, transmitting array 30, and receiving array 40, are formed on the substrate 12 in a unitary manner using microstrip and MMIC technology. The substrate 12 is preferably a single printed circuit board, with the components formed thereon by a unitary photoetching process. The arrays 30 and 40 may be formed by printing or the like on the same surface 12a of the substrate 12 as the antenna elements, or may be formed on the opposite surface and interconnected therewith by vias formed through the substrate 12. The arrays 30 and 40 may be connected to the antenna elements by wirebond, ribbonbond, electromagnetic coupling, or bonding via feedthroughs. In a preferred configuration for fabricating the present sensor, the arrays, antenna elements, and interconnecting transmission lines are formed of microstrips, which may include any combination of a basic microstrip line, slotline, coplanar waveguide, dielectric image guide, inverted microstrip line, trapped inverted microstrip line, finline, suspended stripline, or any practical combination or variation thereof. A general description of currently available MMIC integrated circuit technology including microstrip lines which may used to manufacture the present sensor is found in an article entitled "Millimeter-Wave Integrated Circuits", by K. Chang, in TRW Electronics and Defense Sector/Quest, pp. 43–59 (Winter 1983/84).

The electronic switches 52 and 64 may be formed or mounted on a section 12b of the substrate 12 together with the antenna elements and phased arrays, or on a separate substrate. The transmitter 50 and receiver 62 may be embodied as a single MMIC integrated circuit mounted on the substrate 12, or may be alternatively mounted at any other location, such as inside the body of a vehicle on which the sensor 10 is attached, and connected to the switches by coaxial transmission lines, waveguides, etc.

Figure 2:
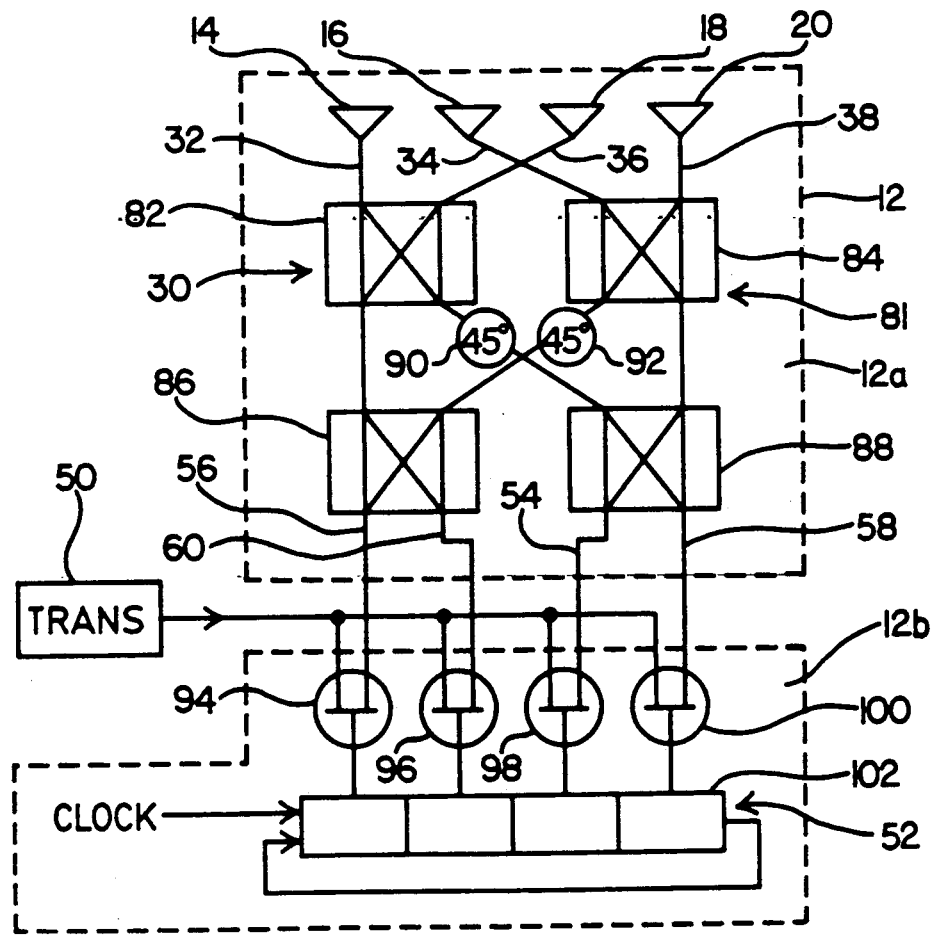
FIG. 2 is a simplified electronic circuit diagram illustrating an example of a transmitting section of the present sensor incorporating a Butler matrix as a passive phased array thereof.

A more detailed diagram of an exemplary embodiment of the transmitting portion of the sensor 10 is provided in FIG. 2. The receiving portion is not shown in detail, but is essentially similar to the transmitting portion. The phased transmitting array 30 is illustrated as being in the form of a Butler matrix 81, including 90° hybrid couplers 82, 84, 86, and 88, and 45° phase shifters 90 and 92, which are interconnected as illustrated in a cross-coupled arrangement. The transmitting switch unit 52 includes electronic switching elements such as field effect transistors (FET) 94, 96, 98, and 100 having sources commonly connected to receive the output signal from the radar transmitter 50, and drains connected to the inputs 56, 60, 54, and 58 respectively. The parallel outputs of a four bit shift register 102 connected to operate as a ring counter are connected to the gates of the FETs 94, 96, 98, and 100 respectively. A logically high bit is circulated through the shift register 102 in response to input clock pulses, sequentially turning on the FETs connected to the parallel outputs of the shift register 102 and switching the output of the transmitter 50 to the inputs of the array 30 respectively. It will be noted that due to the cross-coupling inherent in the Butler matrix 81, a signal applied to the inputs 56, 60, 54, and 58 will result in radiation from the antenna elements 14, 16, 18, and 20 respectively.

Figure 3:
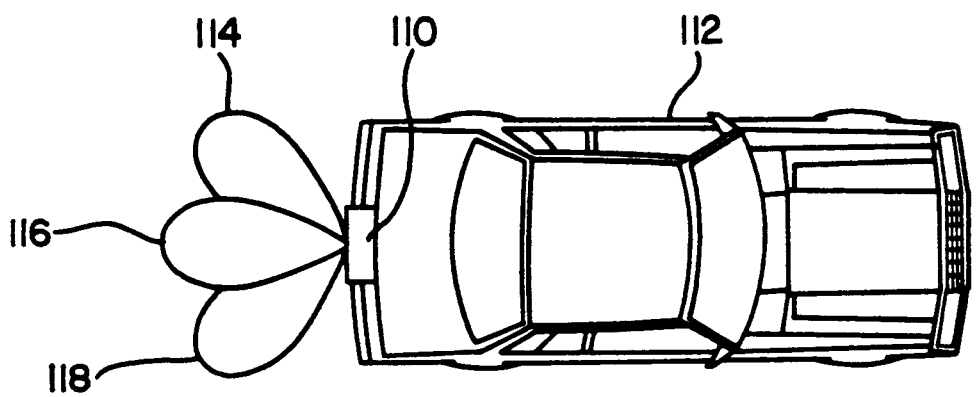
FIG. 3 is a diagram illustrating a sensor embodying the present invention mounted at the rear of an automotive vehicle.

Although the number of transmitting and receiving antenna elements and corresponding components has been described and illustrated as four, the invention is not so limited, and two or more of such elements in any desired number may be provided. FIG. 3 illustrates an electronically scanning vehicle radar sensor 110 embodying the present invention mounted on the rear of an automotive vehicle 112. The sensor 110 is designed to scan a predetermined pattern to the rear of the vehicle 112 using three radar beams 114, 116, and 118 radiated from respective antenna elements (not shown).

Figure 4:
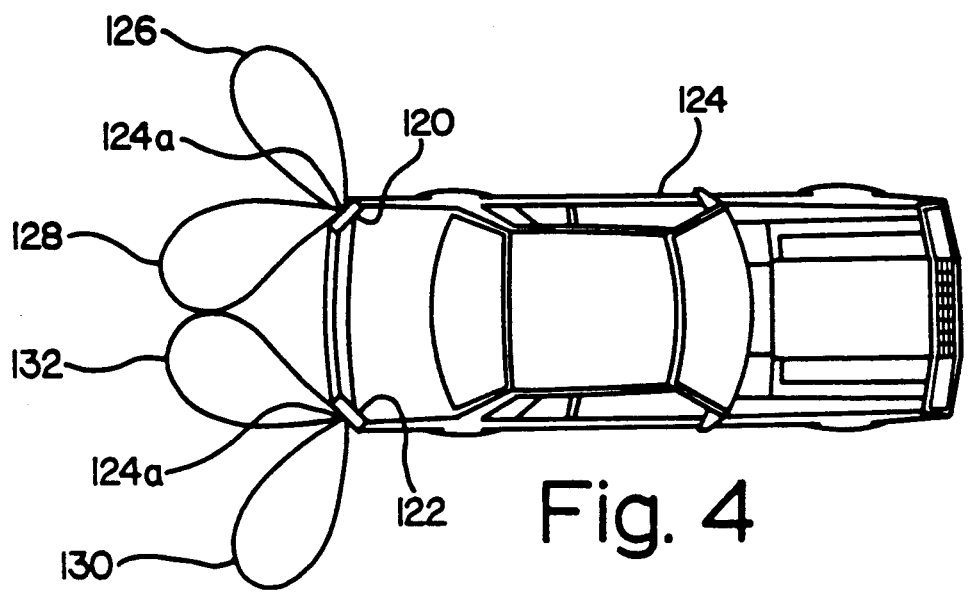
FIG. 4 is a diagram illustrating two planar sensors embodying the invention mounted on respective corners of a vehicle for scanning therearound.

In accordance with a preferred embodiment of the present invention, one or more radar sensors may be mounted on a vehicle as near-object detectors (NODs) to scan around a corner thereof. As illustrated in FIG. 4, two planar radar sensors 120 and 122 embodying the invention are mounted on rear corners 124a and 124b of an automotive vehicle 124, and designed to radiate radar beams 128 and 132 into pattern areas to the rear of the vehicle 124 adjacent to the corners 124a and 124b respectively. The sensors 120 and 122 are further designed to radiate beams 126 and 130 into "blind spot" areas to the opposite sides of the vehicle 124 adjacent to the corners 124a and 124b respectively. The blind spots are generally hidden from the field of view of a driver of a typical automotive vehicle. The present scanning radar sensor enables detection of another vehicle in either or both of the blind spots, providing a safety function which may result in the prevention of many tragic traffic accidents. The rear scan enables detection of another vehicle in close proximity to the rear of the vehicle, which may result in the prevention of similarly tragic rear-end collisions. The rear scan may further prevent collision of the vehicle with a fixed object or other moving vehicle while the vehicle equipped with the sensor is backing up and the driver's rear visibility is limited.

Figure 5:
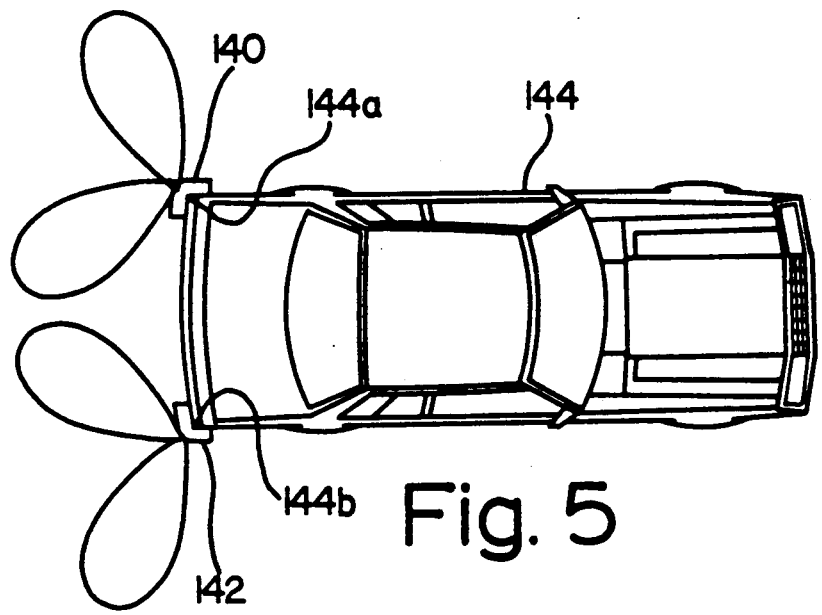
FIG. 5 is similar to FIG. 4, but illustrates the two sensors as being bent around the corners of the vehicle to conform to non-planar mounting surfaces thereof.

FIG. 5 illustrates how the planar sensors 120 and 122 may be replaced by sensors 140 and 142 which have non-planar shapes designed to conform to the non-planar shapes of corners 144a and 144b of an automotive vehicle 144. The sensors 140 and 142 may be molded or otherwise permanently formed into the non-planar shapes. Alternatively, the substrates of the sensors may be made of a flexible material which can be bent to conform to the non-planar mounting surfaces.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A scanning vehicle radar sensor, comprising:
   support means;
   a plurality of transmitting elements formed on the support means in predetermined relation to each other for scanning a predetermined pattern relative to a vehicle on which the sensor is mounted;
   a passive phased transmitting array means formed on the support means, having a plurality of inputs, and a plurality of outputs connected to the transmitting antenna elements respectively;
   radar transmitter means;
   electronic transmitting switch means for sequentially connecting an output of the transmitter means to the inputs of the transmitting array means, and thereby scanning the transmitting antenna elements respectively;
   a plurality of receiving antenna elements formed on the support means in predetermined relation to each other and to the transmitting antenna elements respectively for scanning said predetermined pattern;
   a passive phase receiving array means formed on the support means, having a plurality of inputs connected to the receiving antenna elements respectively, and a plurality of outputs;
   radar receiving means; and
   electronic receiving switch means for scanning the receiving antenna elements in synchronism with operation of the transmitting switch means by sequentially connecting an input of the receiver means to the outputs of the receiving array means respectively;
   the support means comprising a flexible sheet having a surface on which the transmitting and receiving antenna elements are formed for facing away from the vehicle, the sheet being capable of flexure for conforming to a non-planar surface of the vehicle on which the sensor is to be mounted.

2. A sensor as in claim 1, in which the transmitting array means and receiving array means each comprise a planar microstrip Butler matrix.

3. A sensor as in claim 1, in which the transmitting array means and receiving array means each comprise a planar microstrip Blass matrix.

4. A vehicle radar sensor for scanning around a corner of a vehicle, comprising:
   support means for mounting on the corner of the vehicle;
   a plurality of transmitting antenna elements formed on the support means in predetermined relation to each other for scanning a predetermined pattern including areas on opposite sides of the corner of the vehicle;
   radar transmitter means;
   transmitter scanning means for scanningly connecting the transmitter means to the transmitting antenna elements;
   a plurality of receiving antenna elements formed on the support means in predetermined relation to each other and to the transmitting antenna elements respectively for scanning said predetermined pattern;

radar receiver means; and receiver scanning means for scanningly connecting the receiver means to the receiving antenna elements in synchronism with operation of the transmitter scanning means;

the support means comprising a flexible sheet having a surface on which the transmitting and receiving antenna elements are formed for facing away from the corner of the vehicle, the sheet being capable of flexure to conform to a non-planar surface of the corner of the vehicle.

5. A sensor as in claim 4, in which:

the transmitter scanning means includes:

a microstrip passive phased transmitting array means formed on the support means, having a plurality of inputs, and a plurality of outputs connected to the transmitting antenna elements respectively; and electronic transmitting switch means for sequentially connecting an output of the transmitter means to the inputs of the transmitting array means, and thereby scanning the transmitting antenna elements respectively;

the receiver scanning means includes:

a microstrip passive phased receiving array means formed on the support means, having a plurality of inputs connected to the receiving antenna elements respectively, and a plurality of outputs; and electronic receiving switch means for sequentially connecting an input of the receiver means to the outputs of the receiving array means respectively, and thereby scanning the receiving antenna elements in synchronism with operation of the transmitting switch means.

6. A sensor as in claim 5, in which the transmitting array means and receiving array means each comprise a planar microstrip Butler matrix.

7. A sensor as in claim 5, in which the transmitting array means and receiving array means each comprise a planar microstrip Blass matrix.

8. A transmitter for a scanning vehicle radar sensor, comprising:

support means;

a plurality of transmitting antenna elements formed on the support means in predetermined relation to each other for scanning a predetermined pattern relative to a vehicle on which the sensor is mounted;

a passive phased transmitting array means formed on the support means, having a plurality of inputs, and a plurality of outputs connected to the transmitting antenna elements respectively;

radar transmitter means; and electronic transmitting switch means for sequentially connecting an output of the transmitter means to the inputs of the transmitting array means, and thereby scanning the transmitting antenna elements respectively;

the support means comprising a flexible sheet having a surface on which the transmitting antenna elements are formed for facing away from the vehicle, the sheet being capable of flexure for conforming to a non-planar surface of the vehicle on which the sensor is to be mounted.

9. A transmitter as in claim 8, in which the transmitting array means comprises a planar microstrip Butler matrix.

10. A transmitter as in claim 8, in which the transmitting array means comprises a planar microstrip Blass matrix.

* * * * *